United States Patent [19]

Wang

[11] 4,021,845
[45] May 3, 1977

[54] LASER FOR GENERATING WHITE LIGHT

[75] Inventor: Shing Chung Wang, Temple City, Calif.

[73] Assignee: Xerox Corporation, Stamford, Conn.

[22] Filed: Oct. 16, 1975

[21] Appl. No.: 623,167

[52] U.S. Cl. .............................. 358/75; 331/94.5 G
[51] Int. Cl.² ...................... H01S 3/02; H04N 1/46
[58] Field of Search ............ 358/75, 6; 331/94.5 G; 178/7.3 D

[56] References Cited

UNITED STATES PATENTS

| | | | |
|---|---|---|---|
| 3,755,756 | 8/1973 | Silfvast | 331/94.5 G |
| 3,783,185 | 1/1974 | Spaulding | 358/6 |
| 3,860,752 | 1/1975 | Adler et al. | 178/7.3 D |
| 3,942,062 | 3/1976 | Hernqvist | 331/94.5 G X |

OTHER PUBLICATIONS

Fujii et al., "Hollow–Cathode–Type CW White Light Laser", *IEEE Journal of Quantum Electronics*, Mar. 1975, pp. 111–114.

*Primary Examiner*—Robert L. Griffin
*Assistant Examiner*—Mitchell Saffian
*Attorney, Agent, or Firm*—James J. Ralabate; Michael J. Colitz, Jr.; Franklyn C. Weiss

[57] ABSTRACT

A laser structure for generating white laser light when energized by a source of dc voltage. The laser tube structure comprises a gas-filled envelope having a longitudinal axis, an anode electrode forming a portion of the envelope. A hollow cathode is positioned within the envelope and coaxially disposed with respect to the anode electrode portion of the envelope. Members are coaxially aligned with the ends of the envelope such that a structure is provided for confining a gaseous medium therein, a dc voltage applied between the cathode and anode electrode creating a discharge therebetween, the discharge stimulating continuous wave laser emission along the longitudinal axis of the cathode, the laser emission comprising simultaneous multi-line emissions in the form of white light.

35 Claims, 8 Drawing Figures

LASER FOR GENERATING WHITE LIGHT

BACKGROUND OF THE INVENTION

The use of laser systems for printing information on a record medium has been available in the prior art. In general, the output beam of a laser source is controlled by a modulator, such as an acoustic optic modulator, in accordance with the information to be printed on the recording medium. The laser beam is caused to scan across the medium in a first direction while the medium is moved, either incrementally or continuously, in a second direction, orthogonal to the first direction, to provide a two-dimensional scan of the medium. In certain systems, the laser beam directly writes on the recording medium, the information being immediately viewable thereafter. In other scanning systems, a latent electrostatic charge is initially placed on a photoconductive member, the charge being dissipated in accordance with the information to be written by the laser beam. The remaining charge is thereafter developed to produce a visible image.

In other prior art systems, a document is scanned by a laser beam and the light reflected therefrom is converted into an electrical signal to be transmitted over a transmission line to a remote location where a hard copy of the document is reproduced as set forth hereinabove. Alternately, the electrical signal may be utilized locally to provide a hard copy of the scanned document.

The systems described hereinabove in general utilize a laser which generates a beam of light of a single color. For example, helium-neon lasers, which generate a red laser light beam, have been utilized frequently to scan (read) a document and print (write) the modulated information on a recording medium. In those situations wherein a reproduction of a scanned color document is required, the prior art generally has utilized at least two lasers to generate the three primary colors, i.e., red, blue and green for scanning the color document. For example, in the scanning and reproducing system disclosed in U.S. Pat. No. 3,622,690, a helium-neon gas laser is utilized to generate red light whereas an argon laser is utilized to simultaneously generate blue and green light.

Since utilizing more than one laser in a scanning and/or reproducing system and the necessary interaction and control of the operating lasers both increases the cost and complexity of the system, it would be desirable if a single laser which is capable of generating white light, which includes the primary colors, can be provided. In this regard, an article by S. C. Wang et al in *Applied Physics*, entitled "Hollow-Cathode Transverse Discharge He-Ne and He-Cd Lasers", Volume 2, on pages 143–150 in 1973, discloses a perforated hollow-cathode helium-cadmium (He-Cd) laser which produces white light when excited by both dc and pulsed energization resulting in a pulsed white light. The hollow-cathode laser tube described in Wang et al article provides a higher gain for a smaller tube size for the same output than a positive column type laser device.

The disadvantage of the laser described by Wang et al is that the He-Cd device described therein only produces white light when dc and pulsed energization is applied to the laser tube. In other words, the laser light output is in the form of light pulses. In many applications, such as in the scanning techniques set forth hereinabove, it is necessary that continuous wave laser light be generated. Therefore, it would be desirable if a hollow-cathode He-Cd laser system that generates continuous wave white light when energized would be available.

SUMMARY OF THE PRESENT INVENTION

The present invention provides a perforated hollow-cathode He-Cd laser system which generates continuous wave white light when energized by a dc source. The transitions of the cadmium ions produce red, green and blue portions of the spectrum. The laser of the present invention has many practical applications, and in particular, may be utilized in a scanning system wherein a color document is scanned and reproduced at either a local or remote location.

It is an object of the present invention to provide a laser which provides a substantially white laser light.

It is a further object of the present invention to provide a laser for generating a beam of continuous white light, the laser utilizing a perforated hollow-cathode structure.

It is still a further object of the present invention to provide a perforated hollow-cathode laser which produces continuous white laser light when excited by a dc power supply resulting in continuous white light output.

It is a further object of the present invention to provide a perforated hollow-cathode He-Cd laser which generates continuous wave white light when energized by a dc power supply, separation of the white light into its component spectra providing red, green and blue portions of the spectrum produced by the transitions of the cadmium ions.

It is still a further object of the present invention to provide a laser which produces continuous white laser light when excited by a dc power supply, said laser being adapted for use in a laser scanning and reproducing system wherein a color original document is scanned by said laser, the light reflections therefrom being utilized to reproduce the document in color either locally or at a remote location.

DESCRIPTION OF THE DRAWING

For a better understanding of the invention as well as other objects and further features thereof, reference is made to the following description which is to be read in conjunction with the drawing wherein.

DESCRIPTION OF THE PREFERRED EMBODIMENT

Figure 1:
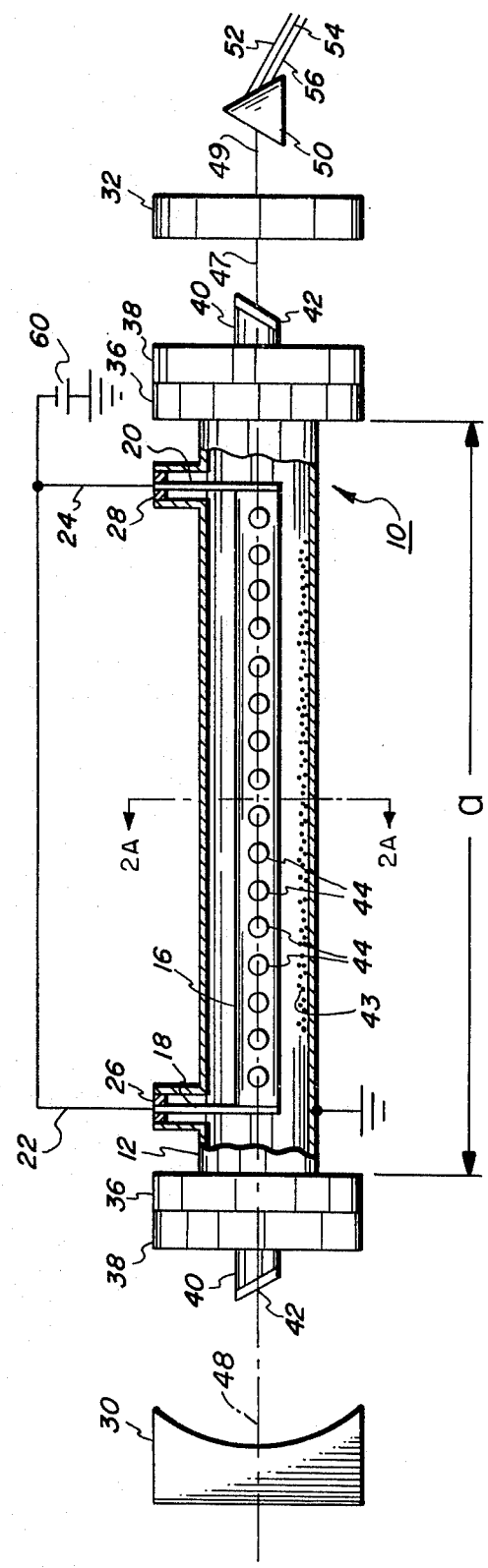
FIG. 1 is a partial side view of the laser tube of the present invention.

Referring now to FIG. 1, a partial sectional view of the laser tube configuration of the present invention is shown. In particular, a discharge tube 10 comprises a gas containing metal envelope 12. Typical materials for envelope 12 include stainless steel, copper and molybedium, envelope, or anode 12, being grounded as shown. A hollow-cathode structure 16, described in more detail hereinafter, is supported by cathode pins 18 and 20 within the envelope 12. Cathode pins 18 and 20 are connected to leads 22 and 24, respectively. Ceramic insulators 26 and 28 are provided to insulate the cathode pins from the grounded envelope 12. The portion of metal envelope 12 which is concentric with cathode 16 functions as the tube anode, although the anode section, in essence, extends between flange members 36 (dimension $a$) as shown.

Axially aligned with hollow-cathode 16 and forming the end elements of the laser optical cavity are totally reflecting plano-concave mirror 30 and an output mirror 32 which transmits a portion of the laser light incident thereon.

The ends of discharge tube envelope 12 are sealed to metal vacuum flange members 36 which in turn is sealed to metal vacuum flange members 38. Extensions 40 are sealed to Brewster windows 42 as shown. Metal vacuum flange members 36 and 38 and extensions 40 may comprise stainless steel. It should be understood that the present invention is equally applicable to a laser where the optical resonator forms an integral part of the discharge tube 10. In this case, Brewster windows 42 are replaced with the optical resonator mirrors 30 and 32. The techniques for sealing windows or mirrors to metal flanges and sealing metal flanges to the metal discharge envelope 12 are well known and will not be set forth herein. The laser active medium, cadmium, is introduced into the laser tube 10 in atomic vapor form by vaporization of cadmium metal. The cadmium metal 43 is placed either inside the tube 12 or via a separate appendage (reservoir) attached to the tube 12 (not shown). The discharge between anode 12 and cathode 16 will cause the cadmium metal 43 placed inside anode 12 to slowly vaporize by the heat of the discharge. An external ac or dc power supply (not shown) is required to vaporize cadmium metal inside the reservoir. In either case, the cadmium vapor is diffused through the perforated cathode holes 44 into cathode 16 where the main laser activity takes place. The laser tube temperature at the envelope (anode) wall is generally determined by the heat generated by the discharge. If sufficient heat is not generated, a separate heater may be applied to the envelope to raise the tube temperature to the desired operating range. The electrical discharge is produced by applying a dc potential from source 60 to cathode pins 18 and 20 via leads 22 and 24, respectively. A typical range of potential is from about −300 to about −400 volts dc. Also confined within the envelope 12 is the gaseous helium which acts as a carrier gas. The discharge between anode and cathode excites the helium atoms to an elevated entropy state from which the energy is imparted to the vaporized cadmium atoms. This causes the cadmium to be ionized and to be excited to the required energy levels necessary for lasing action. As will be explained hereinafter in more detail, the perforated cathode holes 44 formed on cathode 16 allow the discharge to carry into and be confined within cathode 16 thus forming the discharge patterns shown in FIGS. 2A and 2B. The main laser action occurs within this cathode confined discharge region where helium ions and cadmium atoms exchange energy through collisional processes. The continuous wave (CW), simultaneous radiation of red, green and blue laser transitions composed into a beam of white light 47 produced by the aforementioned collisional processes is generated along the axis 48, through Brewster windows 42 and to the cavity mirrors 30 and 32. A portion of this white light beam 49 is transmitted by mirror 32, and can be dispersed into its component prime colors by prism 50 as shown. Alternate dispersive optical elements may be utilized in place of prism 50.

In summary, the white laser beam transmitted by mirror 32 is dispersed into the primary colors of red, green and blue by prism 50. The three color cw laser light thus generated may be utilized, for example, in scanning and reproducing systems wherein the generated white light scans an original color document, the light reflections therefrom being utilized to reproduce the document locally or at a remote location.

Figure 2A:
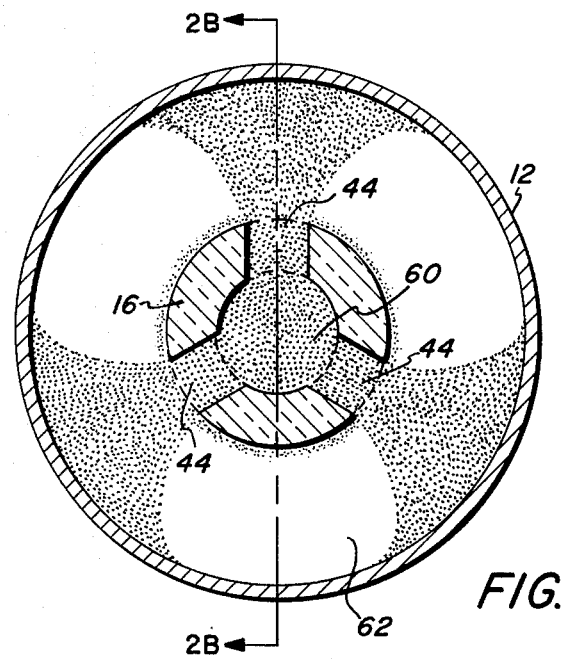
FIG. 2A is a representational cross-sectional view of the hollow-cathode utilized in the laser tube of FIG. 1 along line 2A—2A thereof and illustrating the tube discharge characteristics and FIG. 2B is a section along line 2B—2B of FIG. 2A illustrating the discharge characteristics of the hollow cathode utilized in the laser tube of FIG. 1.
Figure 2B:
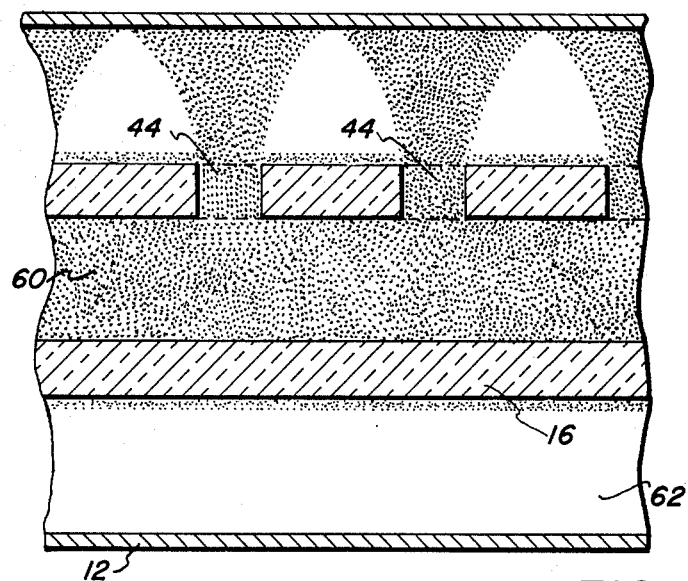

The constructional parameters of the laser tube shown in FIG. 1 will now be set forth. It should be noted that the combination of the cadmium active laser medium and the helium gas produces laser action at the wavelengths of 4416, 5337, 5378, 6355 and 6360 angstroms, with simultaneous laser operation at the blue (4416A), green (5337A, 5378A) and red (6335A, 6360A) of the visible Cd+ transitions using wide band mirrors. A typical hollow-cathode structure consists of a 50 centimeter long, 7.5 millimeter inner diameter Kovar or molybedium tube held inside a 2.5 centimeter outer diameter stainless steel anode cylinder and vacuum envelope 12. The cathode cylinder is perforated and may comprise three parallel rows of 3 millimeter diameter holes 44 spaced 120° apart azimuthally and 6 millimeters apart axially along the entire length of the cathode as shown in FIGS. 2A and 2B. The cathode tube may be supported concentrically inside the anode tube either by flexible pins from side-mounted vacuum feedthroughs in the anode tube at each end of the cathode, as shown in FIG. 1, or by concentric ceramic collars near each end. The overall length of the optical cavity, including the end mirrors, is approximately 90 centimeters, the active cathode length being approximately 50 centimeters.

Figure 3:
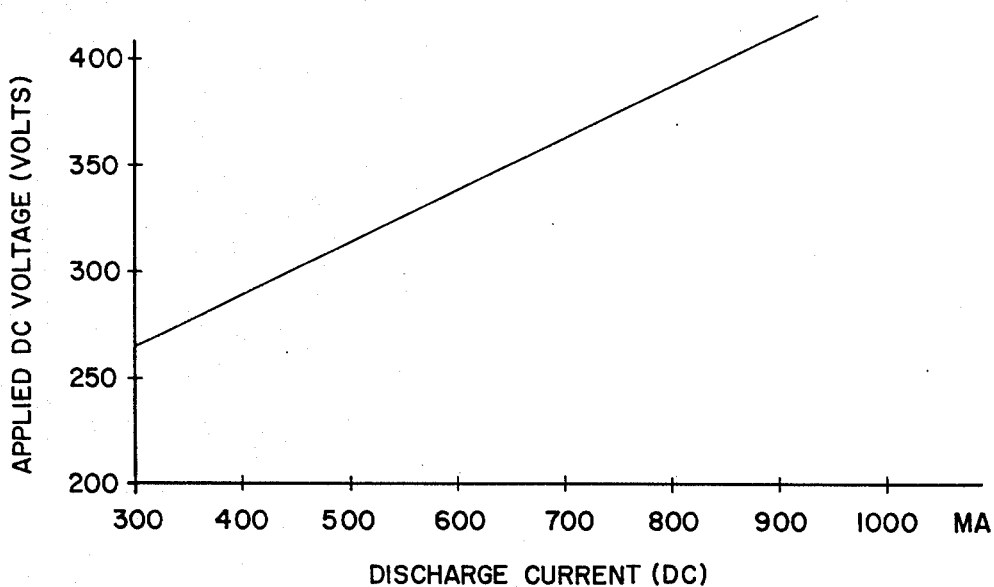
FIG. 3 is a plot illustrating the typical V-I characteristics for the helium-cadmium discharge utilizing the laser tube of FIG. 1.
Figure 4:
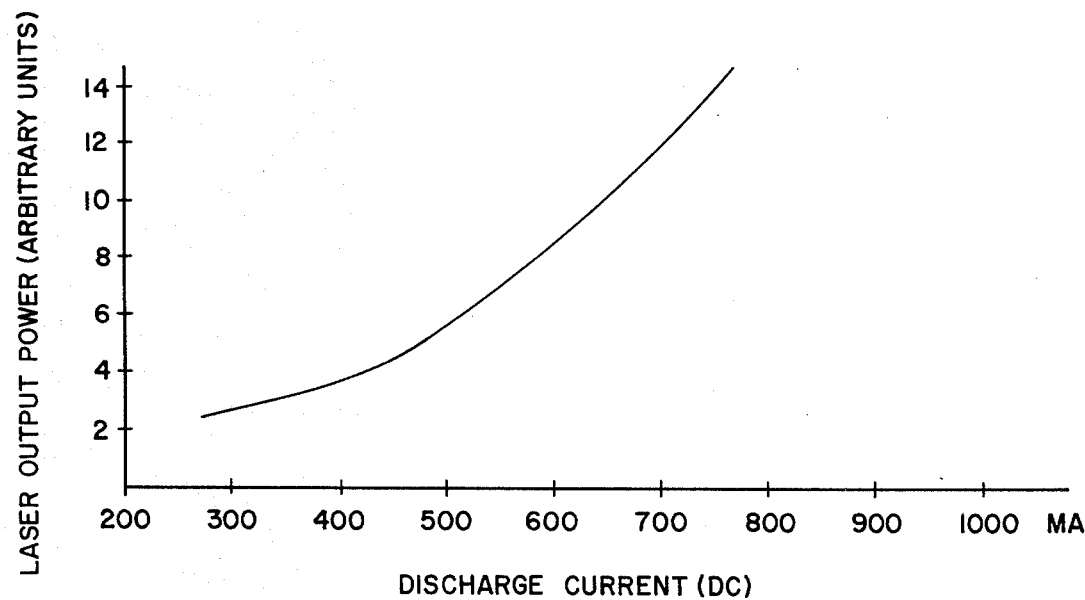
FIG. 4 shows the typical power output in white radiation as a function of the excitation current.

In operation, an intense, uniform, bright cathode glow 60 fills the inside of the hollow-cathode tube as shown in FIGS. 2A and 2B except for a narrow annular cathode-fall region 62 (dark) around the inside periphery of the cathode 16. Tenuous plasma columns extend out through the cathode holes and carry the discharge to the anode. FIG. 3 shows a typical dc voltage-current characteristic of the discharge for a helium pressure of 8.5 Torr and a tube temperature of approximately 310° C. The discharge is characterized by a sustaining voltage of approximately 260 volts. For helium-cadmium mixtures, the sustaining voltage increases as the cadmium vapor pressure increases. The helium-cadmium laser may be operated in the temperature range from approximately 300° C to about 350° C, (corresponding to a range from about 0.045 Torr to about 0.3 Torr cadmium pressure), a helium pressure in the range from about 4 Torr to about 18 Torr, dc excitation in the range from about −300 volts to about −400 volts and a corresponding discharge current in the range from approximately 400 milliamperes to about 1200 milliamperes. Typically, in order to produce a white laser output, the laser tube was successfully operated at 320° C, a helium pressure of 8 Torr, dc excitation of 300 volts and a discharge current of 800 milliamperes. The laser mirrors 30 and 32 are generally characterized as broad band high reflectors with transmission of a few tenths of a percent at the red, green and blue wavelengths. It should be noted that laser output power depends on the helium pressure for each of the three colors at a particular cathode temperature. In the preferred embodiment, the laser is operated in the range of helium pressure from between 4 and 12 Torr. At higher pressures, it becomes difficult to obtain a balanced white laser light since the output power of the red laser line becomes weaker. At lower pressures below 4 Torr the discharge tends to become difficult to sustain. The laser output power is also a function of the cadmium vapor pressure which is determined by the temperature of the laser tube or the reservoir (not shown). FIG. 4 illustrates a typical power output for the laser as a function of discharge current for a helium pressure of approximately 8.5 Torr and a temperature of the laser tube outer wall of approximately 310° C.

The white light laser oscillations, as set forth hereinabove, were obtained at several various conditions on helium pressure, cadmium vapor density (in terms of the tube outer wall temperature) and current. The laser tube operating conditions may be further varied to extend the dynamic range of the white laser tube, the laser output power being optimized by proper design of the output coupling mirror.

In general, certain conditions should be met in order to obtain white laser oscillations. In particular, white laser oscillation requires an effective hollow-cathode discharge with the glow discharge substantially confined inside the cathode region. Further, a substantially uniform discharge along the cathode and a substantially uniform temperature profile along the tube are required to assure uniform cadmium vapor distribution. Additionally, the proper threshold excitation should be provided and the proper optical cavity selected These conditions have been successfully attained by selecting the laser tube configuration as set forth hereinabove and operating the tube within the aforementioned ranges.

Figure 5:
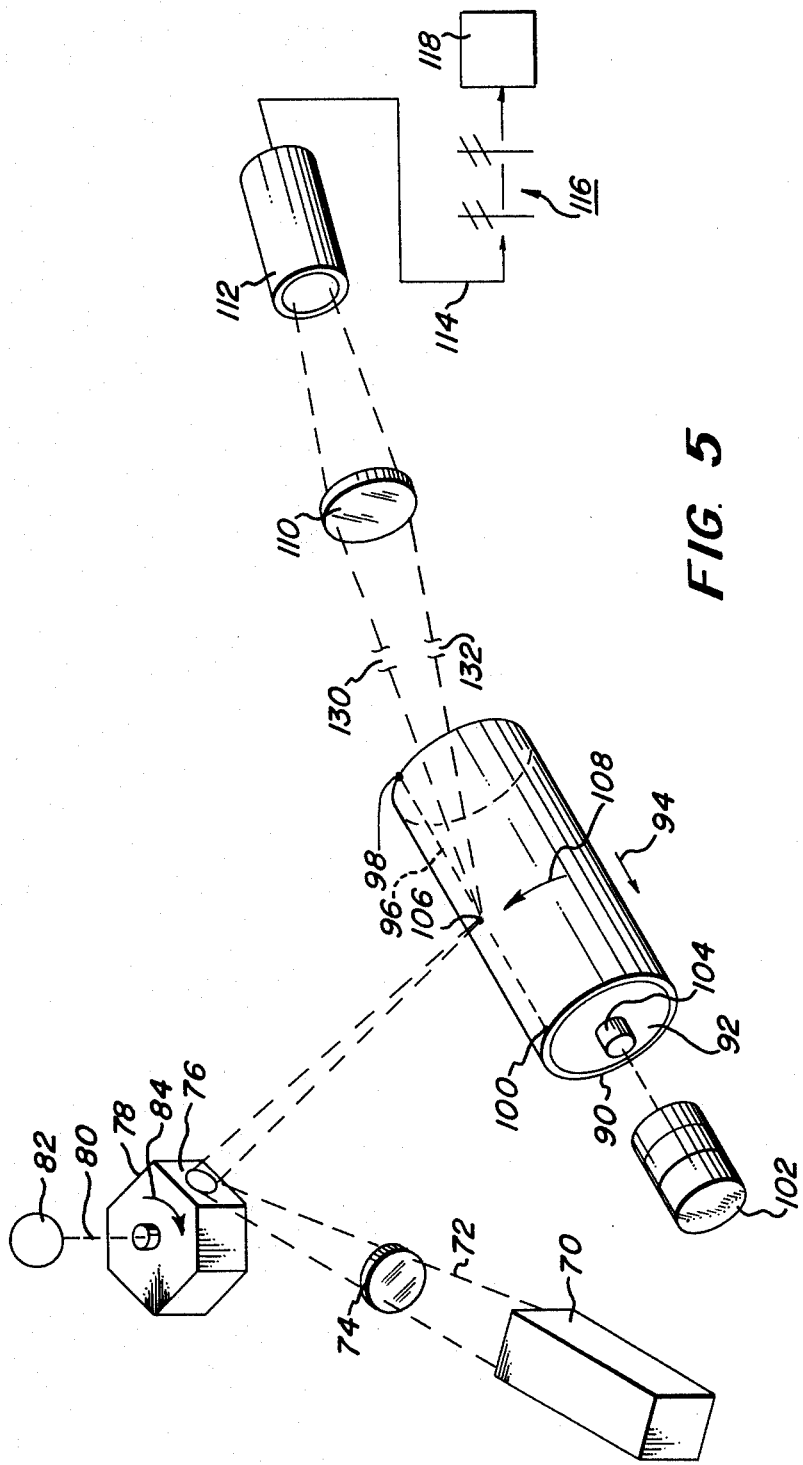
FIG. 5 illustrates the use of the white laser of the present invention in a first scanning mode.

FIG. 5 illustrates the use of a white laser in scanning a color document. In particular, light beam 72, generated by white laser 70 (corresponding to the white laser shown in FIG. 1) is utilized as the scanning light beam and is focused by lens 74 onto one face, or facet, 76 of multifaceted rotating mirror 78. Although mirror 78 is illustrated as comprising six facets, any number of facets may be utilized, the criteria therefor depending in part on scanning resolution, cost, etc. Mirror 78 is mounted on drive shaft 80 which is driven by motor 82, mirror 78 being rotated in the direction of arrow 84. The laser light beam 12 is focused by lens 74 and directed to mirror facet 76 as shown. The laser light beam is reflected by facet 76 to a color document 90 supported by rotating member 92, such as the drum illustrated. By techniques well known in the art, mirror 78 is arranged such that laser beam 72 scans document 90 in the direction of arrow 94 (hereinafter referred to as the $x$ direction) along an element, or scan line, 96 of document 90 from end 98 to end 100 as each facet traverses the laser beam 72 on rotating mirror 78. Drum 92 is adapted to be rotated by motor 102 via drive shaft 104 in the direction of arrow 108. The laser beam focused on document 90 forms a fine scanning spot 106 which traverses an elemental scan line 96 along document 90 from starting point 98 to end point 100. It should be noted that the facet width of mirror 18, and the length of drum 92 are selected such that the traversal of scanning spot 106 across document 90 provides a full line scan of document 90. Since it is desired to provide a color reproduction of document 90, laser 70 is caused to scan each document at least three times, corresponding to the three primary color outputs from laser 70. It should be noted that the white beam output of laser 70 may be utilized directly for scanning purposes without dispersing the beam into its primary colors.

The light reflected from the surface of document 90, the intensity of which is proportional to the informational content thereon, is transmitted through dichroic filter 110 and then to photodetector 112, which may be a photomultiplier tube. The output of photodetector 112 appearing on lead 114 is an electrical signal corresponding to the information detected on document 90 along scan line 106. Dichroic filter 110 (shown in representational form is selected to transmit, in sequence with the scanning of each elemental line 96 three times, each of the three primary colors reflected from document 90 to photodetector 112.

The output of photosensor 112 is directed by lead 114 for transmission over communication lines 116 to a receiver 118 which can be a printer, copier, or the like.

Figure 6:
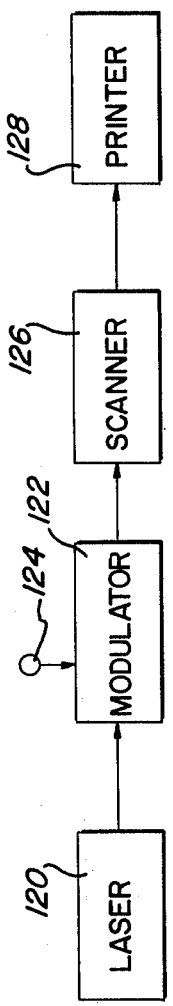
FIG. 6, when considered together with FIG. 5, comprises a system for transmitting the informational content of an original color document to a receiver at a remote location for printing a copy of the original document.

A typical receiving system is represented in FIG. 6 as comprising a laser 120, a light modulator 122 driven by the incoming signal on line 124, a scanner 126 that moves in a synchronous manner with respect to the rotating scanner 78 and drum 92 as shown in FIG. 5 and a printer 128 serving to produce output copy.

Modulator 122 may comprise commercially available acoustic-optic modulators and printer 128 comprises a scanning system similar to that described with reference to FIG. 5 adapted to be utilized with a development apparatus capable of developing multi-color copies of an original color document. An apparatus which is capable of developing a color copy of a color original based on xerographic techniques is disclosed in U.S. Pat. No. 3,854,449, the teachings of which are incorporated herein by reference. By replacing the moving lamp assembly and lens system with a scanning system of the type shown in FIG. 5, removing the platen and providing the proper control interface to enable the scanner and development apparatus to operate in timed relation with the cylical operation of the document scanner, the scanning (writing) light being controlled by the signal on line 124, a color copy of the original may be produced. Laser 120, which produces the writing laser light, may comprise a helium-cadmium or helium-neon laser.

After the scanning spot traverses scan line 96, the remaining informational content on document 90 is similarly scanned (read) and transmitted via line 114 to receiver 118.

Figure 7:
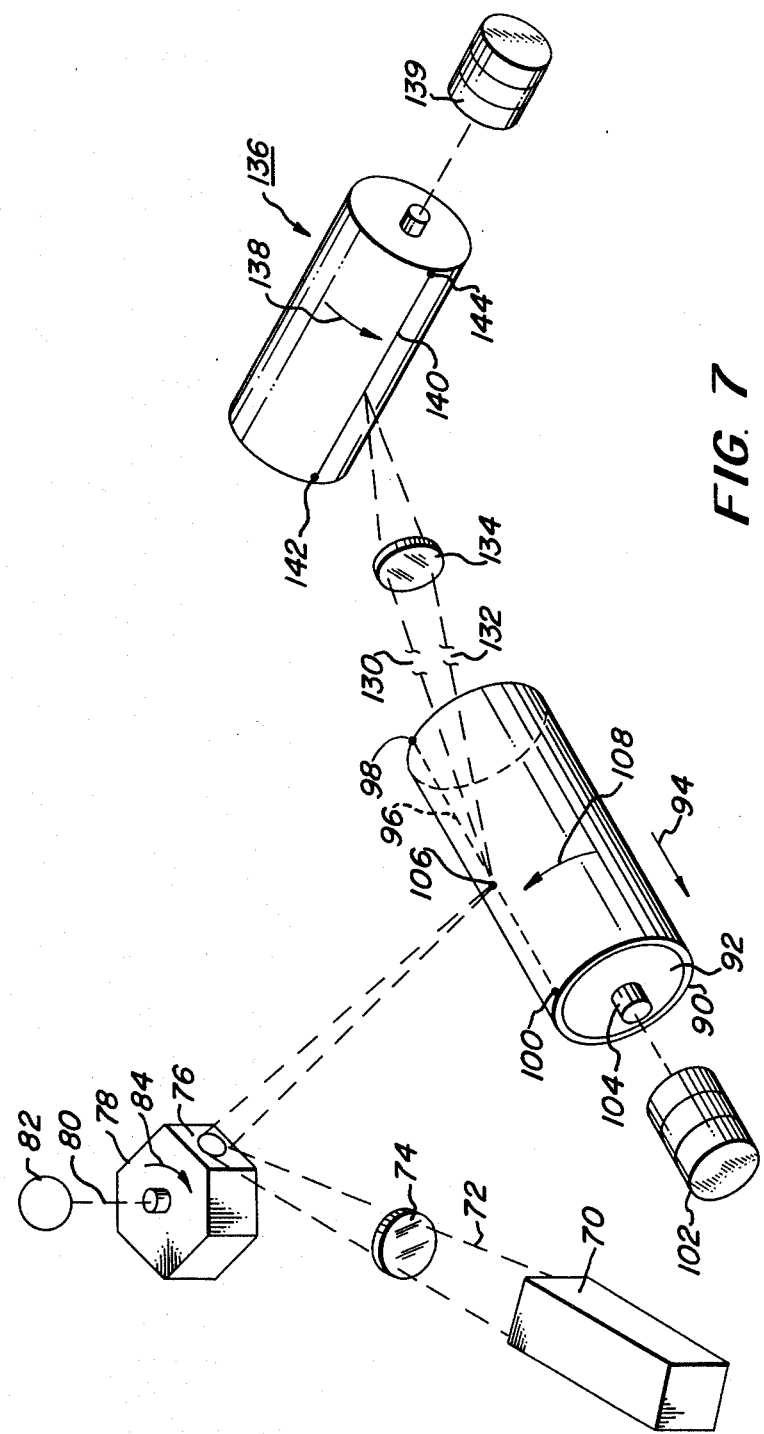
FIG. 7 illustrates the use of the white laser of the present invention in a second scanning mode.

An alternative embodiment, shown in a simplified, representational form is illustrated in FIG. 7 where the structures shown are substituted at points 130 and 132 in FIG. 5 in place of various elements, such as the photosensor 112, by substitution at points 130 and 132 respectively. Information reflected from document 90 passes through lens 134 onto a photoconductive member 136 such as a drum having a photoconductive surface. Drum 136 is rotated in the direction of arrow 138 by drive motor 139, similar to the movement of drum 92 and information is traced on line 140 from point 142 to point 144 as the scanning spot 106 moves from point 98 to point 100 on document 90. As set forth hereinabove with reference to the embodiment shown in FIG. 5, the development apparatus shown in U.S. Pat. No. 3,854,449 may be easily adapted (i.e. photosensitive member 136 corresponds to member 10 shown in the patent) for use with the scanning system of the present invention to provide a color copy of the original.

This embodiment produces a color copy of the original document locally, as opposed to producing a color copy at a remote location with the structure described in FIG. 5.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A laser tube responsive to a predetermined voltage applied thereto for producing a discharge therein comprising:
   a gas-filled envelope having a longitudinal axis,
   an anode electrode forming a portion of said envelope,
   a hollow-cathode located within said envelope, said hollow-cathode being coaxially disposed with respect to said anode electrode portion of said envelope and concentric therewith,
   coaxially aligned end members, said end members and said envelope being adapted to provide a structure for confining a gaseous medium therein,
   means for generating a dc voltage, and
   means for applying said dc voltage between said anode electrode and said hollow-cathode whereby a discharge between said cathode and said anode electrode is created.

2. The laser tube as defined in claim 1 wherein said gas includes a metal vapor.

3. The laser tube as defined in claim 2 wherein said metal vapor is cadmium.

4. The laser tube as defined in claim 3 wherein said gas further includes helium, the helium pressure being in the range from about 4 Torr to about 18 Torr.

5. The laser tube as defined in claim 1 wherein said laser gas is responsive to said discharge for stimulating continuous wave laser emission along the longitudinal axis of said cathode.

6. The laser tube as defined in claim 5 wherein said end members comprise laser mirrors, one of which transmits a portion of said laser emission to utilization means external to said laser tube.

7. The laser tube as defined in claim 5 wherein said end members comprise optically transmissive windows and further including laser mirrors coaxially disposed relative to said windows, one of said laser mirrors transmitting a portion of said laser emission to utilization means external to said laser tube.

8. The laser tube as defined in claim 5 wherein said laser emission comprises simultaneous multiline emissions in the form of substantially white light.

9. The laser tube as defined in claim 8 wherein said laser tube is operated in the temperature range from approximately 300° C to about 350° C.

10. The laser tube as defined in claim 8 further including means for dispersing said white laser light into three primary colors.

11. The laser tube as defined in claim 8 wherein said voltage applied between said anode electrode and said hollow-cathode is of a polarity of cause said cathode to be at a negative potential relative to said anode electrode.

12. The laser tube as defined in claim 11 wherein said dc voltage is in the range from about −300 volts to about −400 volts.

13. A metal vapor laser tube responsive to a predetermined voltage applied thereto for generating continuous wave white laser light comprising:
   a gas-filled envelope having a longitudinal axis, said gas including as a portion thereof a given metal vapor, an anode electrode forming a portion of said envelope,
   a hollow-cathode located within said envelope and coaxially disposed with respect to said anode electrode portion of said envelope and concentric therewith.
   coaxially aligned end members, said end members and said envelope being adapted to provide a structure for confining a gaseous medium therein,
   means for generating a dc voltage, and
   means for applying said dc voltage between said anode electrode and said hollow-cathode whereby a discharge between said cathode and said anode electrode is created, said laser gas being responsive to said discharge for stimulating continuous wave, simultaneous multiline emissions in the form of substantially white light along the longitudinal axis of said cathode.

14. The laser tube as defined in claim 13 wherein said laser emission is directed to a utilization device external to said laser tube.

15. The laser tube as defined in claim 13 wherein said gas further comprises helium, the helium pressure being in the range from about 4 Torr to about 18 Torr.

16. The laser tube as defined in claim 13 wherein said utilization device comprises a scanning device, said scanning device causing said laser emission to sequentially scan the surface of an information bearing medium.

17. The laser tube as defined in claim 16 wherein said utilization means further comprises means for dispersing said white laser emission into three primary colors, said scanning means causing each primary color to scan said medium in sequence.

18. The laser tube as defined in claim 13 wherein said metal vapor is cadmium.

19. The laser tube as defined in claim 18 wherein said laser tube is operated in the temperature range from approximately 300° C to about 350° C.

20. The laser tube as defined in claim 18 wherein said dc voltage applied between said anode electrode and said hollow-cathode is of a polarity to cause said cathode to be at a negative potential relative to said anode electrode.

21. The laser tube as defined in claim 20 wherein said dc voltage is in the range from about −300 volts to about −400 volts.

22. A metal vapor laser tube responsive to a predetermined voltage applied thereto for generating continuous wave white laser light comprising:
  a gas filled envelope having a longitudinal axis, said gas including as a portion thereof a given metal vapor, an anode electrode forming a portion of said envelope,
  a hollow-cathode located within said envelope and coaxially disposed with respect to said anode electrode portion of said envelope and concentric therewith,
  coaxially aligned optically transmissive windows, said windows and said envelope being adapted to provide a structure for confining a gaseous medium therein,
  laser mirrors coaxially aligned with said windows,
  means for generating a dc voltage, and
  means for applying said dc voltage between said anode electrode and said hollow-cathode whereby a discharge between said cathode and said anode electrode is created, said laser gas being responsive to said discharge for stimulating continuous wave, simultaneous multiline emissions in the form of substantially white laser light along the longitudinal axis of said cathode, a portion of said laser light being transmitted through one of said laser mirrors to a utilization device external to said laser tube.

23. The laser tube as defined in claim 22 wherein said gas further comprises helium, the helium pressure being in the range from about 4 Torr to about 18 Torr.

24. The laser tube as defined in claim 22 wherein said utilization device comprises a scanning device, said scanning device causing said laser emission to sequentially scan the surface of an information bearing medium.

25. The laser tube as defined in claim 24 wherein said utilization means further comprise means for dispersing said white laser light into three primary colors, said scanning means causing each primary color to scan said medium in sequence.

26. The laser tube as defined in claim 22 wherein said metal vapor is cadmium.

27. The laser tube as defined in claim 26 wherein said laser tube is operated in the temperature range from approximately 300° C to about 350° C.

28. The laser tube as defined in claim 26 wherein said dc voltage applied between said anode electrode and said hollow-cathode is of a polarity to cause said cathode to be at a negative potential relative to said anode electrode.

29. The laser tube as defined in claim 28 wherein said dc voltage is in the range from about −300 volts to about −400 volts.

30. A laser tube responsive to a predetermined voltage applied thereto for producing a discharge therein comprising:
  a gas-filled envelope having a longitudinal axis,
  an anode electrode forming a portion of said envelope,
  a hollow-cathode located within said envelope, said hollow-cathode being coaxially disposed with respect to said anode electrode portion of said envelope and comprising a perforated, hollow cylindrical member supported within said anode electrode,
  coaxially aligned end members, said end members and said envelope being adapted to provide a structure for confining a gaseous medium therein,
  means for generating a dc voltage, and
  means for applying said dc voltage between said anode electrode and said hollow-cathode whereby a discharge between said cathode and said anode electrode is created.

31. A laser tube responsive to a predetermined voltage applied thereto for producing a discharge therein comprising:
  a gas-filled envelope having a longitudinal axis,
  an anode electrode forming a portion of said envelope,
  a hollow-cathode located within said envelope, said hollow-cathode being coaxially disposed with respect to
  said anode electrode portion of said envelope, said hollow-cathode comprising a hollow cylindrical member having a plurality of parallel rows of apertures spaced around the circumference of said cylindrical member, said apertures being axially spaced a predetermined distance,
  coaxially aligned end members, said end members and said envelope being adapted to provide a structure for confining a gaseous medium therein,
  means for generating a dc voltage, and
  means for applying said dc voltage between said anode electrode and said hollow-cathode whereby a discharge between said cathode and said anode electrode is created.

32. A metal vapor laser tube responsive to a predetermined voltage applied thereto for generating continuous wave white laser light comprising:
  a gas-filled envelope having a longitudinal axis, said gas including as a portion thereof a given metal vapor, an anode electrode forming a portion of said envelope,
  a hollow-cathode located within said envelope and coaxially disposed with respect to said anode electrode portion of said envelope, said hollow-cathode comprising a perforated, hollow cylindrical member supported within said anode electrode,
  coaxially aligned end members, said end members and said envelope being adapted to provide a structure for confining a gaseous medium therein,
  means for generating a dc voltage, and
  means for applying said dc voltage between said anode electrode and said hollow-cathode whereby a discharge between said cathode and said anode electrode is created, said laser gas being responsive to said discharge for stimulating continuous wave, simultaneous multiline emissions in the form of substantially white laser light along the longitudinal axis of said cathode.

33. A metal vapor laser tube responsive to a predetermined voltage applied thereto for generating continuous wave white laser light comprising:
  a gas-filled envelope having a longitudinal axis, said gas including as a portion thereof a given metal vapor, an anode electrode forming a portion of said envelope,
  a hollow-cathode located within said envelope and coaxially disposed with respect to said anode electrode portion of said envelope, said hollow cathode comprising a hollow cylindrical member having a plurality of parallel rows of apertures spaced around the circumference of said cylindrical member, said apertures being axially spaced a predetermined distance, coaxially aligned end members, said end members and said envelope being adapted to provide a structure for confining a gaseous medium therein, means for generating a dc voltage, and means for applying said dc voltage between said anode electrode and said hollow-cathode whereby a discharge between said cathode and said anode electrode is created, said laser gas being responsive to said discharge for stimulating continuous wave, simultaneous multiline emissions in the form of substantially white laser light along the longitudinal axis of said cathode.

34. A metal vapor laser tube responsive to a predetermined voltage applied thereto for generating continuous wave white laser light comprising:

a gas-filled envelope having a longitudinal axis, said gas including as a portion thereof a given metal vapor, an anode electrode forming a portion of said envelope, a hollow-cathode located within said envelope and coaxially disposed with respect to said anode electrode portion of said envelope, said hollow-cathode comprising a perforated, hollow cylindrical member supported within said anode electrode, coaxially aligned optically transmissive windows, said windows and said envelope being adapted to provide a structure for confining a gaseous medum therein, laser mirrors coaxially aligned with said windows, means for generating a dc voltage, and means for applying said dc voltage between said anode electrode and said hollow-cathode whereby a discharge between said cathode and said anode electrode is created, said laser gas being responsive to said discharge for stimulating continuous wave, simultaneous multiline emissions in the form of substantially white laser light along the longitudinal axis of said cathode, a portion of said laser light being transmitted through one of said laser mirrors to a utilization device external to said laser tube.

35. A metal vapor laser tube responsive to a predetermined voltage applied thereto for generating continuous wave white laser light comprising:

a gas-filled envelope having a longitudinal axis, said gas including as a portion thereof a given metal vapor, an anode electrode forming a portion of said envelope, a hollow-cathode located within said envelope and coaxially disposed with respect to said anode electrode portion of said envelope, said hollow-cathode comprising a hollow cylindrical member having a plurality of parallel rows of apertures spaced around the circumference of said cylindrical member, said apertures being axially spaced a predetermined distance, coaxially aligned optically transmissive windows, said windows and said envelope being adapted to provide a structure for confining a gaseous medium therein, laser mirrors coaxially aligned with said windows, means for generating a dc voltage, and means for applying said dc voltage between said anode electrode and said hollow-cathode whereby a discharge between said cathode and said anode electrode is created, said laser gas being responsive to said discharge for stimulating continuous wave, simultaneous multiline emissions in the form of substantially white laser light along the longitudinal axis of said cathode, a portion of said laser light being transmitted through one of said laser mirrors to a utilization device external to said laser tube.

* * * * *

UNITED STATES PATENT AND TRADEMARK OFFICE
CERTIFICATE OF CORRECTION

PATENT NO. : 4,021,845
DATED : May 3, 1977
INVENTOR(S) : Shing Chung Wang

It is certified that error appears in the above-identified patent and that said Letters Patent are hereby corrected as shown below:

In column 8, line 14, after "polarity" delete "of" and insert --to--.

Signed and Sealed this nineteenth Day of July 1977

[SEAL]

Attest:

RUTH C. MASON
Attesting Officer

C. MARSHALL DANN
Commissioner of Patents and Trademarks